United States Patent [19]

Krummell et al.

[11] Patent Number: 5,415,300

[45] Date of Patent: May 16, 1995

[54] PUSH-BACK CART STORAGE SYSTEM

[76] Inventors: John V. R. Krummell, 591-102 John K. Dr., Long Beach, Calif. 90803; Kenneth E. Davison, 1134 Cypress Ave., #3, Hermosa Beach, Calif. 90245

[21] Appl. No.: 148,214

[22] Filed: Nov. 5, 1993

[51] Int. Cl.⁶ .............................................. A47F 5/00
[52] U.S. Cl. .................... 211/151; 211/59.2; 414/276
[58] Field of Search .................. 211/151, 59.2, 162; 414/276, 286

[56] References Cited

U.S. PATENT DOCUMENTS

| | | |
|---|---|---|
| 2,880,024 | 3/1959 | Hewitt . |
| 3,038,613 | 6/1962 | Sylvester et al. . |
| 3,399,784 | 9/1968 | Buchbinder . |
| 3,465,894 | 9/1969 | Setecka . |
| 3,567,039 | 3/1971 | Evans . |
| 3,744,646 | 7/1973 | Duncan et al. . |
| 3,757,967 | 9/1973 | Golbridge . |
| 4,140,225 | 2/1979 | Hilgers et al. . |
| 4,155,462 | 5/1979 | Bendel . |
| 4,197,047 | 4/1980 | Haldimann . |
| 4,223,792 | 9/1980 | Aspen . |
| 4,227,466 | 10/1980 | Rooklyn . |
| 4,341,313 | 7/1982 | Doring . |
| 4,462,500 | 7/1984 | Konstant et al. . |
| 4,613,270 | 7/1986 | Konstant et al. . |
| 4,657,317 | 4/1987 | Gemma . |
| 4,687,404 | 8/1987 | Seiz et al. . |
| 4,715,765 | 12/1987 | Agnoff . |
| 4,738,369 | 4/1988 | Desjardins . |
| 4,773,546 | 9/1988 | Konstant . |
| 4,915,240 | 4/1990 | Konstant . |
| 4,949,852 | 8/1990 | Allen . |
| 4,955,489 | 9/1990 | Allen . |
| 4,982,851 | 1/1991 | Konstant . |
| 5,137,159 | 8/1992 | Collins et al. . |
| 5,141,118 | 8/1992 | Gay ..................... 211/151 |
| 5,170,896 | 12/1992 | Konstant . |
| 5,180,069 | 1/1993 | Krummell . |
| 5,203,464 | 4/1993 | Allen . |
| 5,312,004 | 5/1994 | Krummell et al. .............. 211/151 |
| 5,316,157 | 5/1994 | Konstant ....................... 211/151 |
| 5,328,038 | 7/1994 | Allen ............................ 211/151 |

OTHER PUBLICATIONS

3D Storage Systems Limited Pushback Brochure.
Ridg-U-Rak Push-bak Storage Systems Brochure.
Artco Corporation Advertisement–Apr. 1990.

Primary Examiner—Robert W. Gibson, Jr.
Attorney, Agent, or Firm—Lyon & Lyon

[57] ABSTRACT

A push-back cart storage system includes an outer cart having wheels rolling on support rails. A middle cart has forward wheels rolling on side members of the outer cart. Rear wheels on the middle cart role on the support rails. An inner cart has front wheels rolling on side members of the middle cart, while rear wheels of the inner cart role on the side rails. The rolling carts are all of equal height.

8 Claims, 6 Drawing Sheets

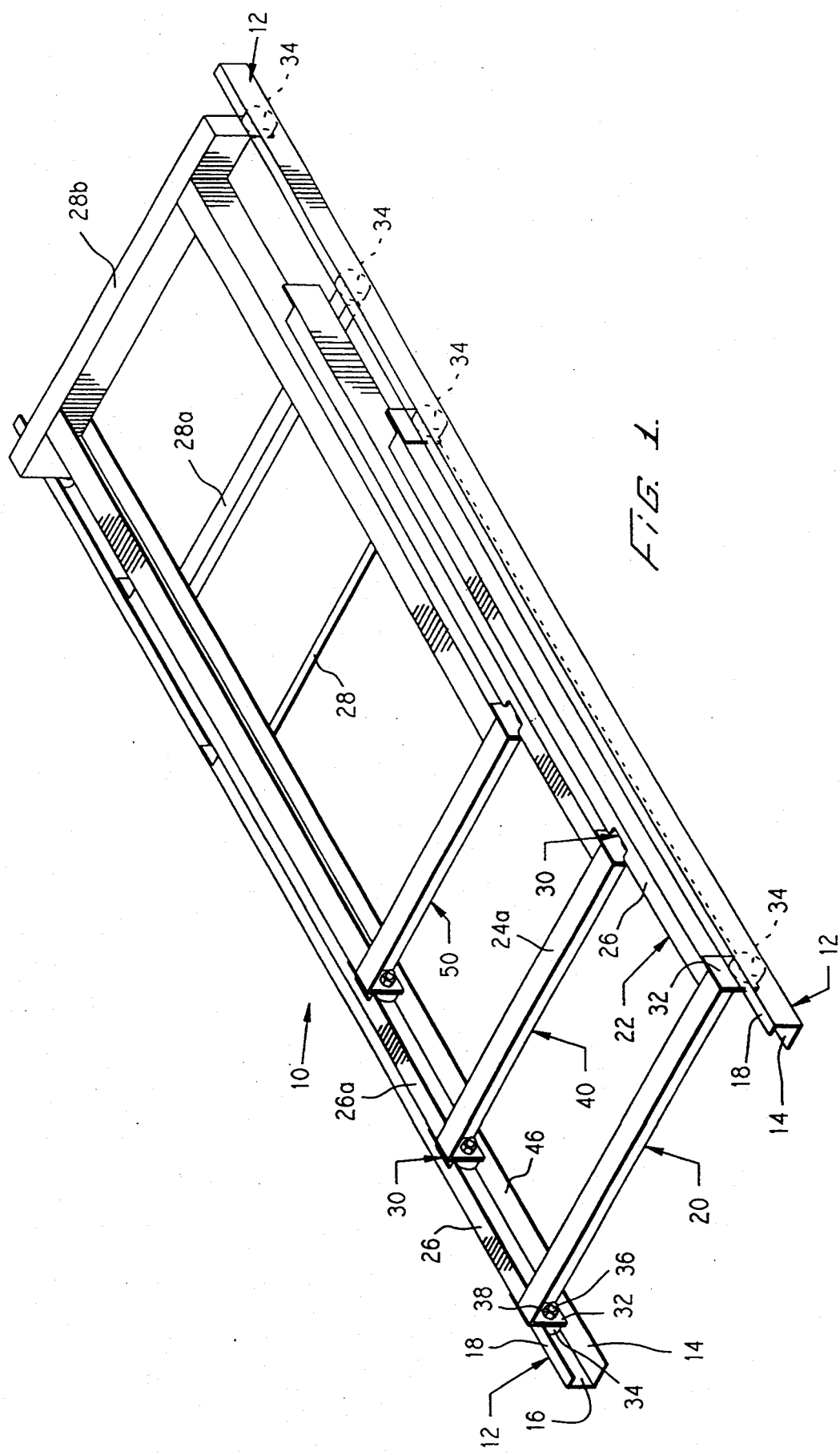

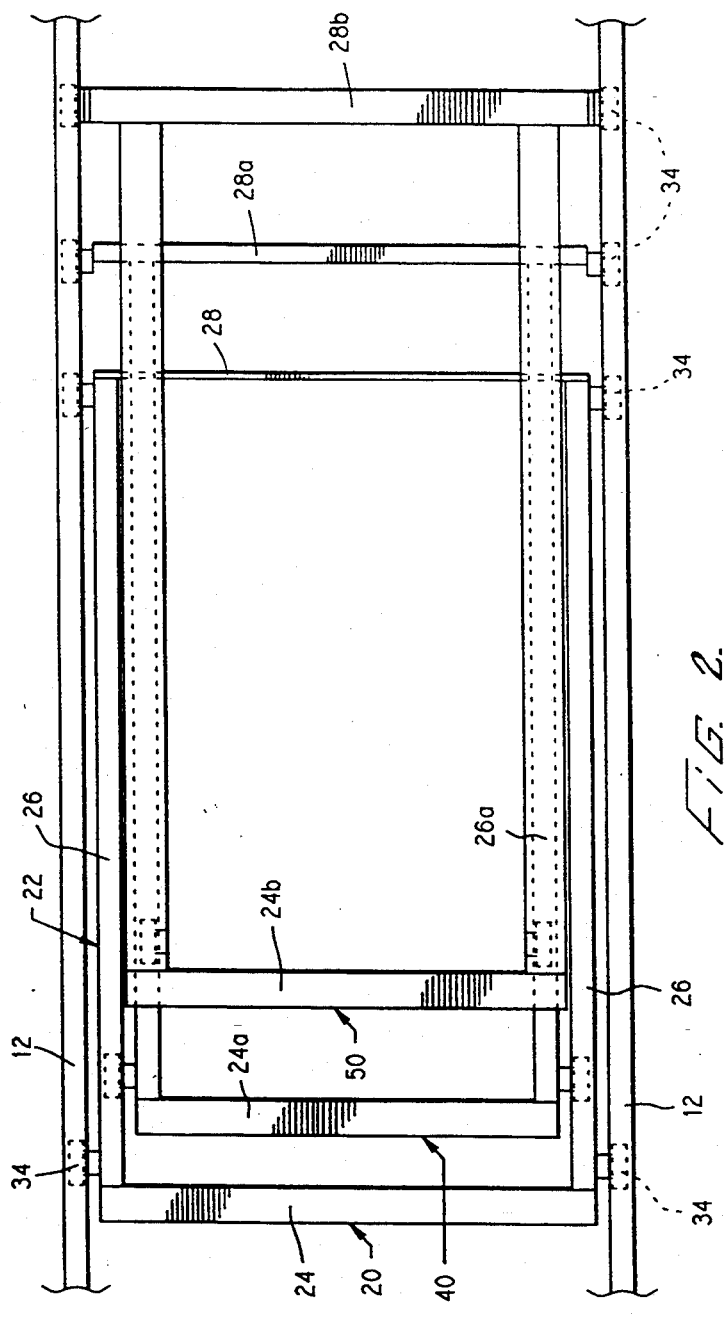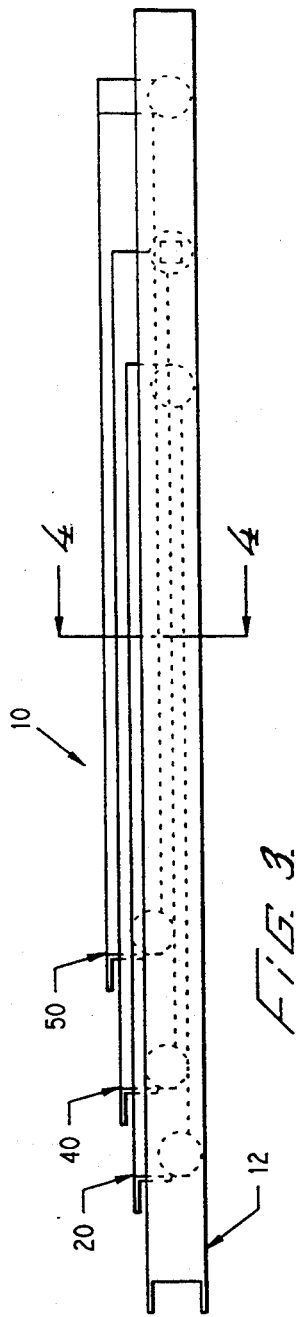

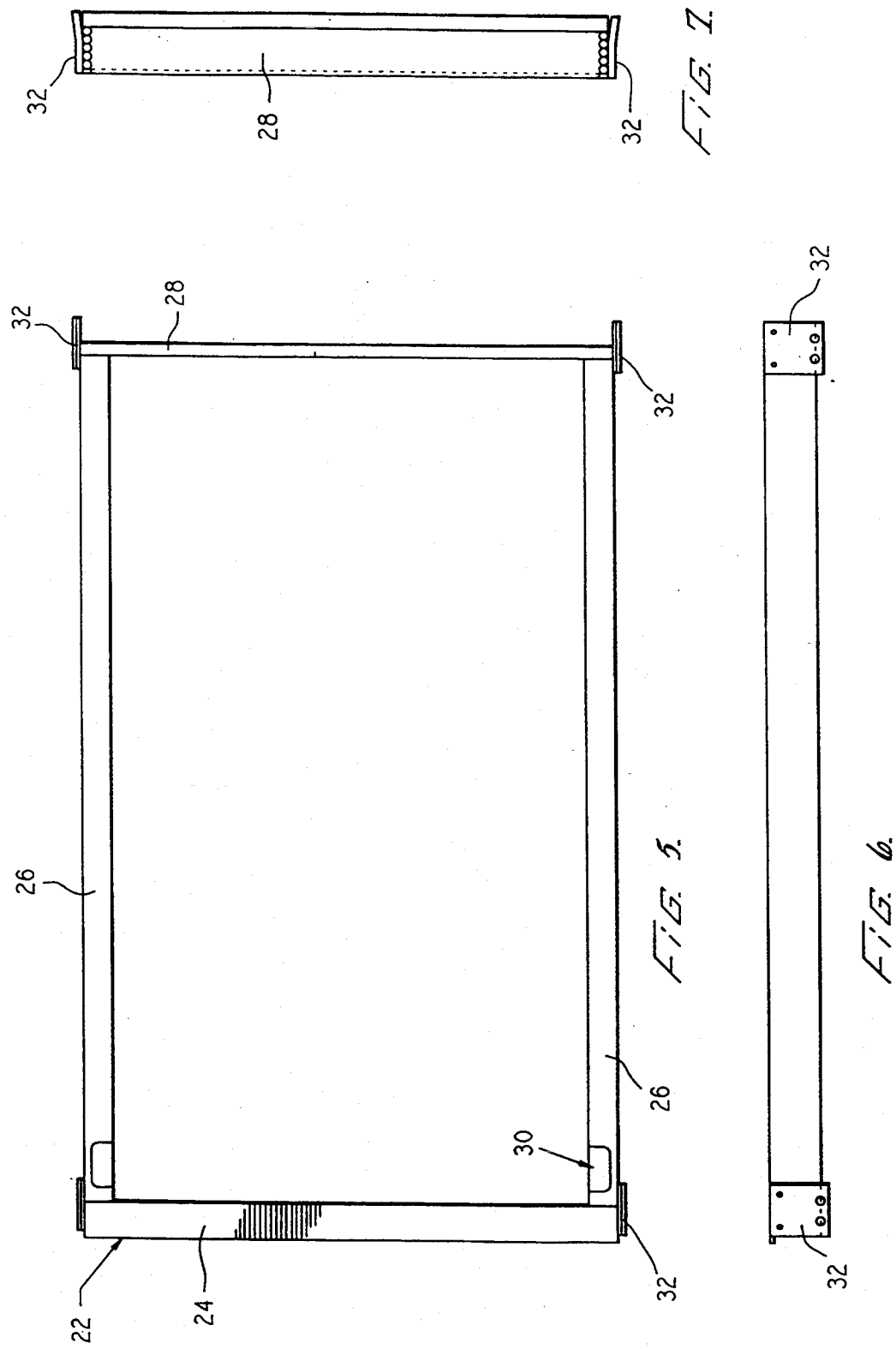

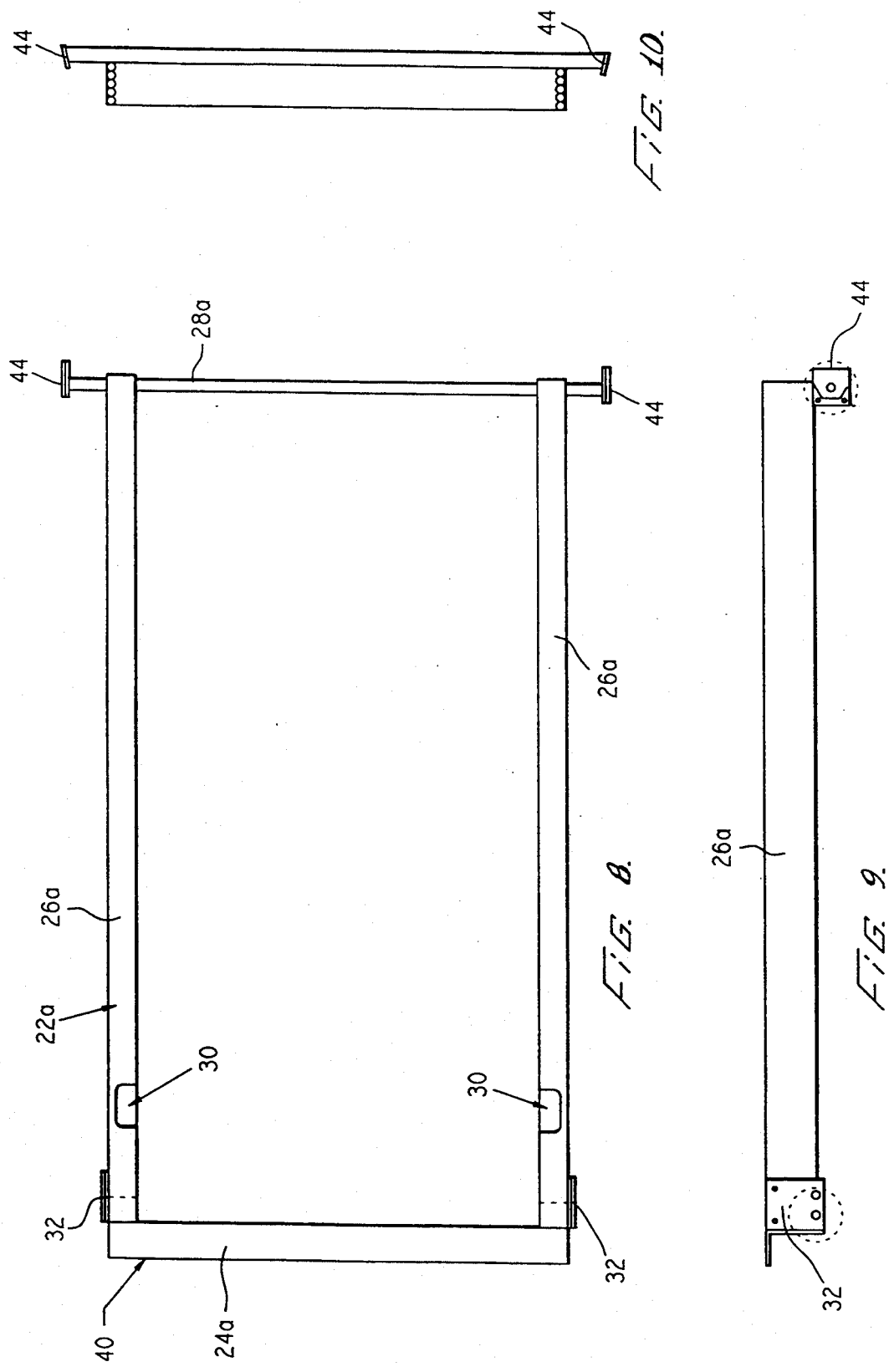

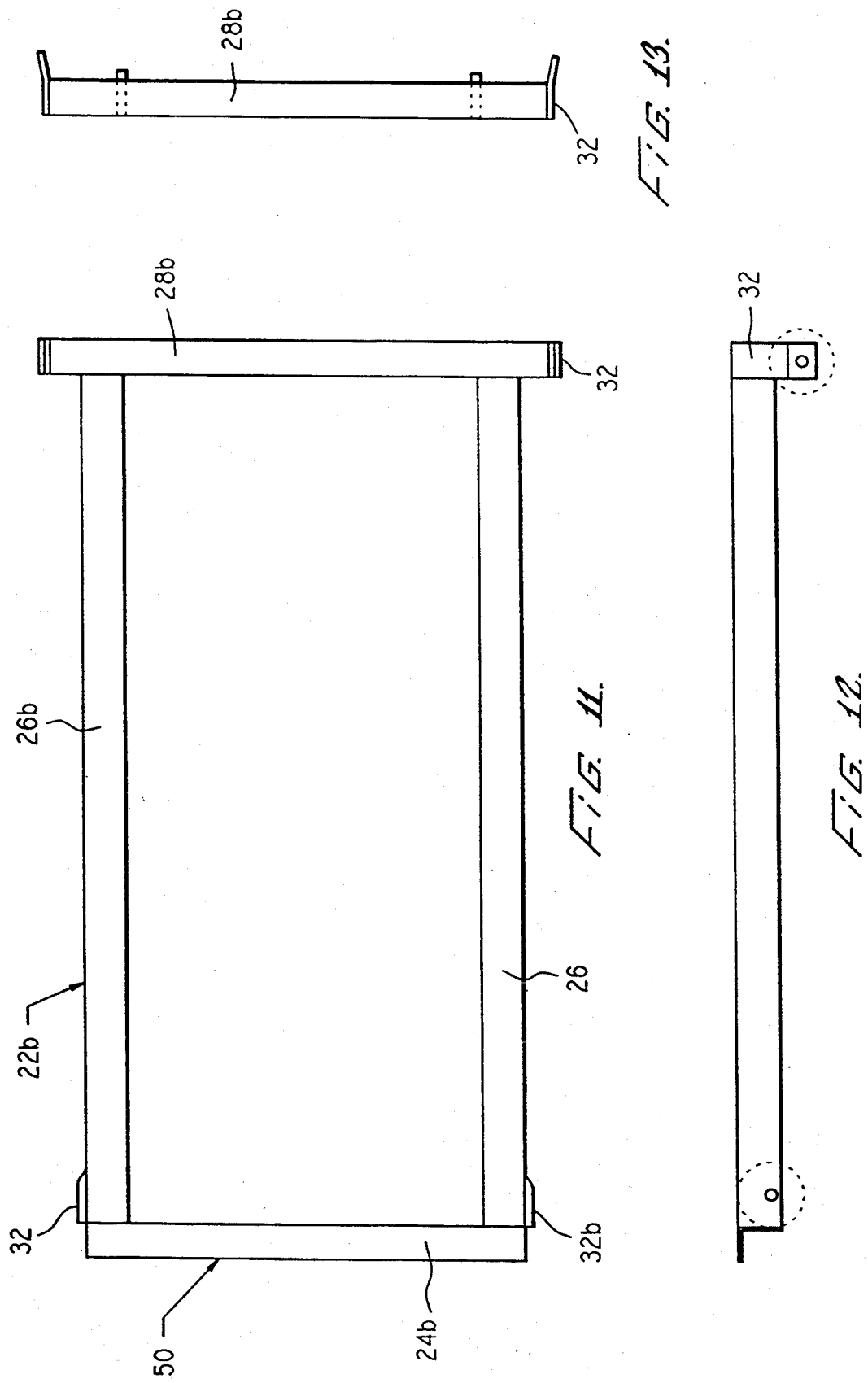

PUSH-BACK CART STORAGE SYSTEM

BACKGROUND OF THE INVENTION

The field of the invention is push-back storage systems.

Push-back cart storage systems typically use rolling carts for carrying pallets or other cargo, on slightly inclined rails. By providing several carts on a set of rails, useable space between aisles in e.g., a warehouse, is increased as multiple pallets can be stored and retrieved from a single aisle. Consequently, aisle space necessary in conventional storage racks for forklift access may be used for additional storage racks, providing more efficient use of space.

Although various push-back cart storage systems have been used in the past, there is a need for an improved system which may be readily fabricated from standard structural members, is convenient and effective in use, and which provides for increased storage efficiency.

SUMMARY OF THE INVENTION

To these ends, the present push-back cart storage systems includes a pair of spaced apart support rails each having a lower inside flange or roller support surface. An outer cart has wheels which roll on the lower inside flange of the support rails. The outer cart 20 has side members 26 also having a lower inside flange. A middle cart has front wheels which roll on the lower inside flanges of the side members of the outer cart. Rear wheels on the middle cart roll directly on the support rails. For a four deep system, an inner cart may be provided with front wheels rolling on lower inside flanges of side members of the middle cart, and with rear wheels of the inner cart rolling directly on the support rails.

Accordingly, it is an object of the invention to provide an improved push-back cart storage system. Other and further objects and advantages will appear hereinafter.

BRIEF DESCRIPTION OF THE DRAWINGS

In the drawings, wherein similar reference characters denote similar elements, throughout the several views:

FIG. 1 is a perspective view of the present push-back cart storage system;
FIG. 2 is a top plan view thereof;
FIG. 3 is a side elevation view thereof;
FIG. 5 is a top plan view of an outer cart frame;
FIG. 6 is side elevation view thereof;
FIG. 7 is a rear elevation view thereof;
FIG. 8 is a top plan view of a middle cart frame;
FIG. 9 is a side elevation view thereof;
FIG. 10 is an end elevation view thereof;
FIG. 11 is a top plan view of an inner cart frame;
FIG. 12 is a side elevation view thereof;
and
FIG. 13 is an end elevation view thereof.

DETAILED DESCRIPTION OF THE PREFERRED EMBODIMENT

Figure 4:
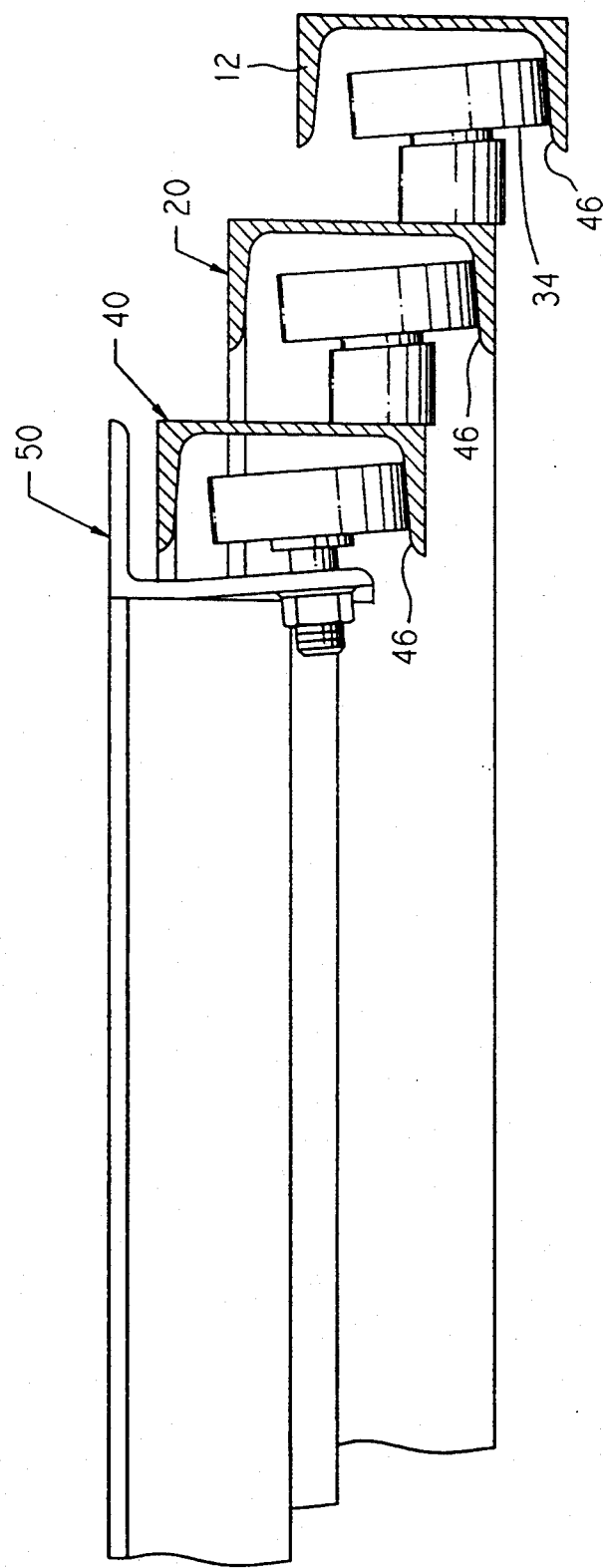
FIG. 4 is a section view fragment taken along line 4—4 FIG. 3.

Turning now to the drawings, as shown in FIG. 1, the present push-back cart storage system 10 includes a pair of spaced apart support rails 12. The support rails 12 may be of various designs, e.g., I-beams, C-sections, etc., and as shown in FIG. 1 in a preferred embodiment, include an upper leg or flange 18, a lower flange 14 longer than the upper flange 18, and a web 16 connecting the upper flange 18 and lower flange 14. Alternatively, any supporting surface or floor may be used instead of the rails 12.

Referring to FIGS. 1, 2, and 6, an outer cart 20 includes a preferably rectangular frame 22 having a front cross member 24, side members 26 and a rear cross member 28. The rectangular frame 22 may be made of welded together standard structural beams or shapes. The side members 26 include a lower inner flange 46 similar to flange 14 of the support rails 12.

Angle plates 32 are preferably attached at the four corners of the frame 22 of the outer cart 20 to support wheels 34. The wheels 34 may be attached to the angle plates 32 via a nut 38 clamping the wheel stud to the angle plate 32, as shown in FIG. 1.

Referring to FIGS. 1, 2, and 8-10, a middle cart 40 also includes a preferably rectangular frame 22a having a front cross member 24a, side members 26a and a rear cross member 28a, each slightly shorter than the corresponding members on the outer cart 20, such that the middle cart 40 may be fit within or contained by the outer cart 20.

As shown in FIG. 8, the front end of the middle cart 40 preferably includes angle plates 32. However, the back end of the middle cart 40 has extended angled ends projecting from the rear cross member 28a.

Referring to FIGS. 1-4, the front wheels 34 of the middle cart 40, supported on the angle plates 32, roll on the lower flange 46 of the side members 26 of the outer cart 20. However, the rear wheels 34 on the middle cart 40, mounted on the angle ends 44 of the rear cross member 28a, roll on the flange 14 of the support rails 12. Referring to FIG. 9, the rear wheels on the middle cart 40 are positioned slightly below the front wheels, so that the middle cart 40 remains level with its front wheels riding on the support rails 12 and its rear wheels riding on the side members 26 of the outer cart 20.

As shown in FIGS. 1 and 5, slots 30 are provided in the side members 26 on the outer cart 20 to allow the front wheels of the middle cart 40 to be positioned into the lower flange of the side members 26 of the outer cart 20, during installation.

As shown in FIG. 4, the wheels 34 of the outer cart 20 and middle cart 40 preferably are attached at a slight angle, so that the wheels role perpendicularly on their supporting surfaces.

Using the outer cart 20 and middle cart 40, as described above, a three-deep push-back cart storage system is provided, as a first pallet may be supported on the middle cart 40, a second pallet supported on the outer cart 20, and a third pallet supported directly on top of the support rails 12, with the middle and outer carts pushed back.

In a four-deep push-back cart storage system an inner cart 50 as shown in FIGS. 1-3 and 11-13, includes a rectangular frame 22b having front cross member 24b, side member 26b and rear cross member 28b, dimensioned to allow the inner cart to fit within the middle cart. Similar to the middle cart 40, the inner cart 50 preferably includes angle plates 32 at its front corners, and angle ends or plates on the rear cross member 28b. The rear wheels of the inner cart 50 are positioned slightly below the forward wheels. As shown in FIGS. 1-4, the front wheels on the inner cart 50 roll on the side members 26a of the middle cart 40, while the rear wheels of the inner cart 50 roll on the support rails 12. The middle cart 40 also includes slots 30 so that the inner cart 50 may be installed into the middle cart 40.

As shown in FIG. 4, the outer, middle and inner carts are all of equal height. The small amount of vertical clearance between the carts allows flat pallets to be supported only on the top surface of a single cart. Referring to FIGS. 1 and 4, the carts roll into each other, in a somewhat telescoping arrangement, rather than rolling over or under each other. In addition, the front wheels of the middle cart 40 and inner cart 50 roll on the middle cart and outer cart 20, respectively rather than on the support rails 12.

Of course, in addition to the three-deep and four-deep embodiments described above, a five (or more)-deep embodiment may also be used, by providing one or more additional carts, as will be understood by those skilled in the art. In addition, the carts need not be rectangular, and other arrangements of the cart wheels and supporting flanges or rails may be used.

Thus, although a preferred embodiment has been shown and described, it would be apparent to those skilled in the art that many changes and modifications may be made thereunto without the departing from the spirit and scope of the invention.

I claim:

1. A push-back cart storage system comprising:
   a pair of spaced apart support rails, with each support rail having a lower inside flange;
   a first cart having a generally rectangular frame including front and rear cross members and side support members, front and rear wheels in rolling engagement on the lower flanges of the support rails, and with the side support members having lower side member flanges; and
   a second cart having front wheels and rear wheels and a generally rectangular frame including front and rear cross members joined by side members, with the front wheels of the second cart in rolling engagement with the lower side member flanges of the first cart, and with the rear wheels of the second cart in rolling engagement with the lower inside flanges of the support rails.

2. The push-back cart storage system of claim 1 further comprising a third cart having front wheels supported on side members of the second cart, and having rear wheels supported on the lower flanges of the support rails.

3. The push-back cart storage system of claim 1 wherein the rear wheels of the second cart are positioned below the front wheels of the second cart.

4. The push-back cart storage system of claim 1 wherein the side members of the first cart each comprise a structural shape having an upper flange connected to a lower flange by a web.

5. The push-back cart storage system of claim 1 wherein the first and second cart are of approximately equal height.

6. The push-back cart storage system of claim 2 wherein the first, second, and third cart are of approximately equal height.

7. The push-back cart storage system of claim 2 wherein the front wheels of the third cart are above the front wheels of the second cart, and the front wheels of the second cart are above the front wheels of the first cart.

8. The push-back cart storage system of claim 1 wherein the rear wheels of the second cart are spaced apart farther than the front wheels of the second cart.

* * * * *